United States Patent
Ramaley et al.

(10) Patent No.: US 6,626,956 B1
(45) Date of Patent: Sep. 30, 2003

(54) EDIT-TIME REDIRECT FOR HTML DOCUMENTS

(75) Inventors: Alan A. Ramaley, Seattle, WA (US); Thomas Olsen, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/334,044

(22) Filed: Jun. 15, 1999

(51) Int. Cl.[7] .............................................. G06F 17/00
(52) U.S. Cl. .......................... 715/513; 715/516; 707/1
(58) Field of Search .............................. 707/513, 505, 707/506, 507, 1; 715/505, 506, 507, 513–516, 501.1; 717/106–113

(56) References Cited

U.S. PATENT DOCUMENTS

| | | | | |
|---|---|---|---|---|
| 5,778,372 A | * | 7/1998 | Cordell et al. ............... 707/100 |
| 5,805,889 A | * | 9/1998 | Van De Vanter | |
| 5,880,740 A | * | 3/1999 | Halliday et al. ............ 210/318 |
| 5,887,133 A | * | 3/1999 | Brown et al. ................ 709/200 |
| 5,890,171 A | * | 3/1999 | Blumer et al. .............. 100/252 |
| 5,905,991 A | * | 5/1999 | Reynolds .................. 707/501.1 |
| 5,978,791 A | * | 11/1999 | Farber et al. ................... 707/2 |
| 6,157,935 A | * | 12/2000 | Tran et al. ................... 707/503 |
| 6,260,043 B1 | * | 7/2001 | Puri et al. .................... 707/101 |
| 6,266,678 B1 | * | 7/2001 | McDevitt et al. ........... 707/201 |
| 6,266,682 B1 | * | 7/2001 | LaMarca et al. ......... 707/501.1 |
| 6,389,427 B1 | * | 5/2002 | Faulkner .................. 707/104.1 |

OTHER PUBLICATIONS

Ragget et al, "HTML 4.0 Specification, W3 Organization", <http://www.w3.org/TR/REC-html40/>, Apr. 1998, pp. 1–366.*

"12 Links," part of the HTML 4.0 Specification, W3 Organization website found on the World Wide Web at http://www.w3.org/TR/REC-html40/, editied by Dave Raggett, Arnaud Le Hors and Ian Jacobs, Copyright ©1997 W3C (MIT, INRIA, Keio), revised on Apr. 24, 1998, pp. 1–6.

* cited by examiner

*Primary Examiner*—Joseph H. Feild
(74) *Attorney, Agent, or Firm*—Merchant & Gould P.C.

(57) ABSTRACT

Redirecting an editing environment to open a primary file instead of an associated supporting file. Each supporting file can be provided with a marker identifying it as a supporting file and specifying the location of the primary file associated with that supporting file. This can be done in response to the initiation of a file save event for saving the supporting file. For opening a file in the editing environment, the file open process relies on the presence of a marker in the file to determine if the file is a supporting file. If so, the editing environment is redirected to open the primary file with which the supporting file is associated. For example, for an HTML document containing a primary file and a supporting file, the editing environment is directed to open the primary file rather than the supporting file to support the presentation of the entire content of the HTML document for editing by the user.

33 Claims, 3 Drawing Sheets

EDIT-TIME REDIRECT FOR HTML DOCUMENTS

FIELD OF THE INVENTION

The invention relates generally to managing files in a computer system, and, more particularly, relates to placing a marker in a first file that an application has been directed to open in order to redirect the application to instead open a second file.

BACKGROUND OF THE INVENTION

An HTML document typically comprises a primary file in HTML format and zero or more associated supporting files. A supporting file can be embedded in the primary file and can represent embedded content of the primary file. A supporting file can be in HTML format or some other file format.

Some editing environments allow the user to edit an HTML document by selecting and editing the individual files that together form the HTML document. To enable the user to choose which file to select and edit, the user is presented with a raw directory of individual files.

The drawback of these editing environments is that the editing model is based on the expectation that the user has an understanding of the HTML document's file structure. If a user wants to modify an aspect of an HTML document, the user must know both the name and location of the file that pertains to that aspect of the HTML document in order to select that file for editing. Many users, however, are not aware of their HTML document's file structure. As an HTML document may be composed of many files, a user who knew the file structure details of an HTML document at the time the user created the document is likely to forget them by a later time when he attempts to modify the HTML document. A user who wishes to edit an HTML document typically opens several files in the raw directory presented to him until, by trial and error, he finds the desired file.

U.S. patent application Ser. No. 09/233,991, pending, assigned to the assignee of the present application, teaches an improved editing environment for managing embedded content in HTML documents. In an improved editing environment, the user creates an HTML document in the editing environment without a need to know the file structure details of storing the HTML document. To the user, the HTML document appears to be one seamless file in the editing environment. In response to the user creating an HTML document in this improved editing environment, however, the editing environment creates supporting files to represent much of the content of the HTML document. These supporting files are then embedded in a primary file by the editing environment, and the files associated with the HTML document can be saved.

When the improved editing environment opens the primary file of an HTML document at a later time, the editing environment can use the described file structure to recreate the original editing experience for the user without requiring the user to know any details of the HTML document's file structure. In other words, the editing environment recreates for the user the impression that there is only one seamless file to edit.

However, many users are not aware of the distinction between primary files and supporting files. If a user instructs the improved editing environment to open a supporting file instead of a primary file when presented with a raw directory of files, the editing environment has no way of knowing that the chosen file is a supporting file. The editing environment in this case opens for editing only the supporting file that was chosen. This typically leads to confusion on the part of the user if the user is not aware of the HTML document's file structure. The user may be confused because the user expects to see the entire HTML document, just as he did during the original document creation experience.

Therefore, there is a need in the art for an editing environment that enables a user to edit an HTML document without requiring that the user understand the HTML document's file structure.

SUMMARY OF THE INVENTION

The present invention meets the need for an improved editing environment by allowing an editing environment to open a primary file instead of an associated supporting file that the editing environment has been instructed to open. If the primary and supporting files are part of an HTML document, then redirecting an editing environment to the primary file allows the editing environment to present for editing the entire content of the HTML document.

Generally described, the invention is a computer-implemented method for opening a file. A file open event for opening the file is detected. In response to the file open event, an inquiry is conducted to determine if the file has a marker or tag indicating that the file is a supporting file. If the file has a marker indicating that the file is a supporting file, the primary file with which the supporting file is associated is opened instead.

The primary file can be opened in an editing environment or in a different application. According to an aspect of the invention, the marker can be placed in the supporting file in response to a file save event for saving the supporting file. The marker may also provide the location of the primary file.

The primary file and the supporting file may be part of an HTML document. An HTML document typically comprises a primary file in HTML format and zero or more associated supporting files. A supporting file can be embedded in the primary file and can represent embedded content of the primary file. A supporting file can be in HTML format or some other file format.

If the supporting file of an HTML document is in HTML format, it can be provided with a marker in the form of a <link> tag placed in the <head> section of the supporting file. The <link> tag can have the following format:

<link id=Main-file rel=Main-File href="RelURI">, where "RelURI" is a relative URI specifying the location of a primary file relative to the supporting file.

The various aspects of the present invention may be more clearly understood and appreciated from a review of the following detailed description of the disclosed embodiments and by reference to the appended drawings and claims.

DETAILED DESCRIPTION OF THE EXEMPLARY EMBODIMENTS

Figure 1:
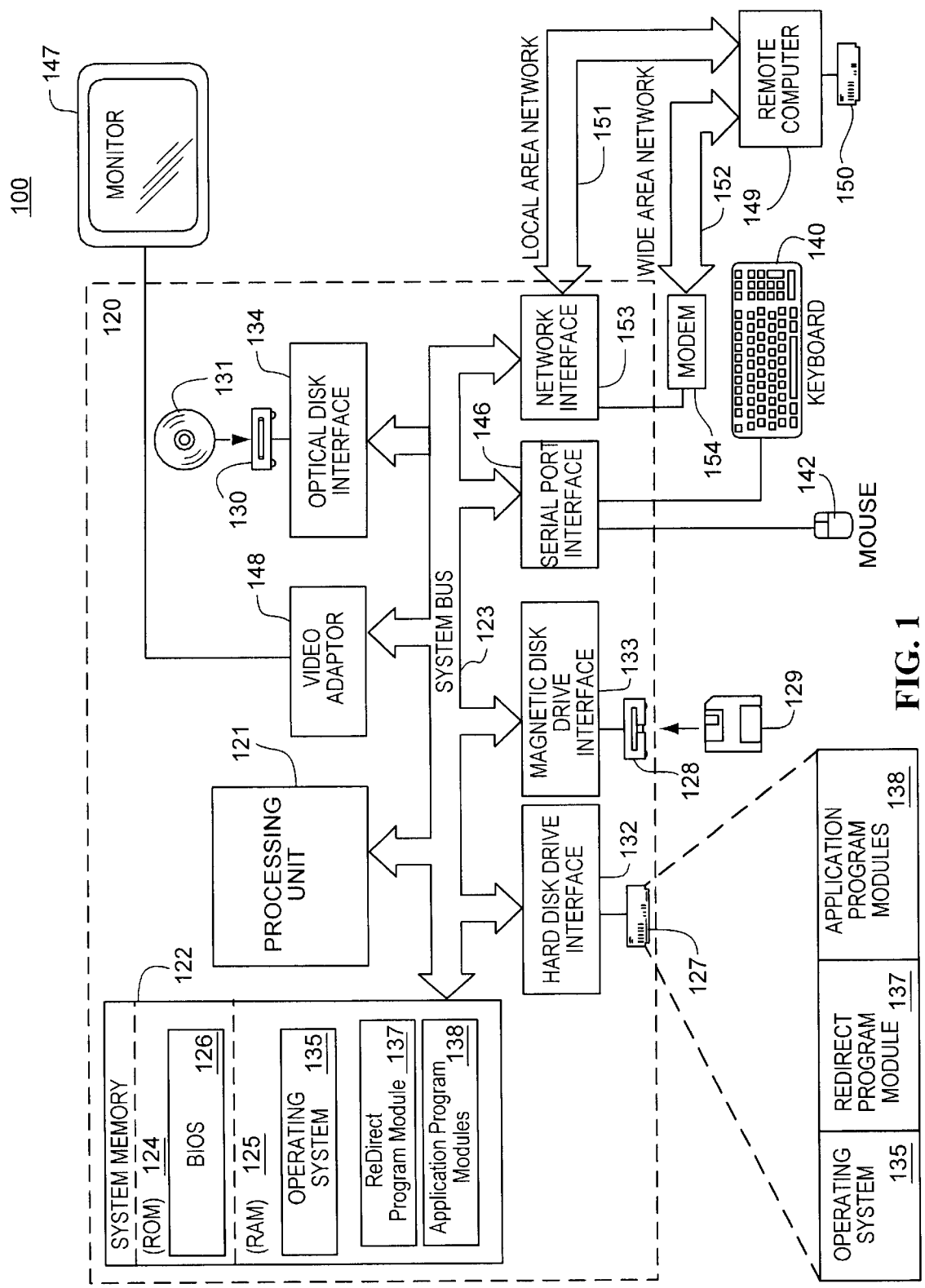
FIG. 1 is a block diagram illustrating the operating environment for an exemplary embodiment of the present invention.

The present invention is typically embodied in a computer-implemented method for redirecting an editing environment to open a primary file instead of an associated supporting file. Generally, this method can be viewed as having two components. In the first component, each supporting file is provided with a marker identifying it as a supporting file and specifying the location of the primary file associated with the supporting file. This is preferably done in response to the initiation of a file save event for saving the supporting file. The second component supports the opening of a file in an editing environment. The file open process relies on the presence of a marker in the file the editing environment has been directed to open to determine whether the file is a supporting file. If so, the editing environment is redirected to open the primary file with which the supporting file is associated.

Referring now to the drawings, in which like numerals refer to like elements throughout the several figures, the detailed description will elaborate on aspects of the present invention. First, an exemplary operating environment for this invention is described. Then, details of embodiments of the present invention in a HyperText Markup Language (HTML) environment are given.

Exemplary Operating Environment

FIG. 1 and the following discussion are intended to provide a brief and general description of a suitable computing environment 100 for an implementation of an exemplary embodiment of the present invention. The exemplary operating environment 100 includes a conventional personal computer system 120, including a processing unit 121, a system memory 122, and a system bus 123 that couples the system memory 122 to the processing unit 121. The system memory 122 includes read only memory (ROM) 124 and random access memory (RAM) 125. A basic input/output system 126 (BIOS), containing the basic routines that help to transfer information between elements within the personal computer system 120, such as during start-up, is stored in ROM 124.

The personal computer system 120 further includes a hard disk drive 127, a magnetic disk drive 128, e.g., to read from or write to a removable magnetic disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage for the personal computer system 120. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

A user may enter commands and information into the personal computer 120 through conventional input devices, including a keyboard 140 and pointing device, such as a mouse 142. The computer system 120 may include additional input devices (not shown), such as a microphone, joystick, game pad, satellite dish, scanner, or the like. These and other input devices are often connected to the processing unit 121 through a serial port interface 146 that is coupled to the system bus, but may be connected by other interfaces, such as a game port or a universal serial bus (USB). A monitor 147 or other type of display device is also connected to the system bus 123 via an interface, such as a video adapter 148. In addition to the monitor, personal computer systems typically include other peripheral output devices (not shown), such as speakers or printers.

The personal computer system 120 may operate in a networked environment using logical connections to one or more remote computer systems, such as a remote computer system 149. The remote computer system 149 may be a server, a router, a peer device or other common network node, and typically includes many or all of the elements described relative to the personal computer system 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer system 120 is connected to the LAN 151 through a network interface 153. When used in a WAN networking environment, the personal computer system 120 typically includes a modem 154 or other means for establishing communications over a WAN 152, such as the Internet. The modem 154, which may be internal or external, is connected to the system bus 123 via the serial port interface 146. In a networked environment, program modules depicted relative to the personal computer system 120, or portions thereof, may be stored in the remote memory storage device 150. It will be appreciated that the network connections shown are exemplary and other means of establishing a communications link between the computer systems may be used. It will be further appreciated that the invention could equivalently be implemented on host or server computer systems other than personal computer systems, and could equivalently be transmitted to the host computer system by means other than a CD-ROM, for example, by way of the network connection interface 153.

A number of program modules may be stored in the drives and RAM 125 of the computer system 120. Program modules control how the computer system 120 functions and interacts with the user, with I/O devices or with other computers. Program modules include routines, operating system 135, application program modules 138, data structures, browsers, and other software or firmware components. An exemplary embodiment of the present invention comprises one or more Redirect program modules 137 stored in RAM 125 of the computer 100. Alternatively, a Redirect program module 137 may be implemented as part of the application program modules 138 or the operating system 135.

Those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Redirecting an Editing Environment From a Supporting File to a Primary File in HTML Format One example of files to which the present invention is applicable is an HTML document. An HTML document typically comprises a primary file in HTML format and zero or more associated supporting files. A supporting file can be embedded in the primary file and can represent embedded content of the primary file. A supporting file can be in HTML format or some other file format.

The present invention is preferably practiced with an editing environment taught by U.S. patent application Ser. No. 09/233,991. U.S. patent application Ser. No. 09/233,991, entitled "Method for Managing Embedded Files for a Document Saved in HTML Format", is hereby incorporated by reference. Both application Ser. No. 09/233,991 and the present application are assigned to Microsoft Corporation of Redmond, Washington.

U.S. patent application Ser. No. 09/233,991 teaches an editing environment that manages the details of storing an HTML document that is created or modified in the editing environment. These details include saving the HTML document as a primary file and supporting files that, where necessary, represent embedded content of the HTML document. This editing environment gives the user the impression that the HTML document the user is creating or modifying is a single, seamless collection of content rather than a collection of supporting files embedded in a primary file.

As the editing environment manages the file structure used to store the HTML document, the user need not even be aware of this file structure. If the editing environment is instructed to open the primary file of an HTML document, the editing environment creates the impression that the HTML document contains a single, seamless collection of content in the editing environment. This allows the user to edit all aspects of the HTML document in the editing environment. As taught by U.S. patent application Ser. No. 09/233,991, the preferred editing environment is preferably provided with the primary file of an HTML document for it to create the described editing experience for the user.

If, on the other hand, this preferred editing environment is instructed to open a supporting file of an HTML document, the editing environment does not have the necessary information to provide the user with the ability to edit the entire HTML document. Instead, the editing environment opens up just the supporting file in the editing environment.

When an editing environment is instructed to open a supporting file of an HTML document, an exemplary embodiment of the present invention can redirect the editing environment to open the primary file. In doing so, the exemplary embodiment enables the editing environment to present all the files of the HTML document for editing as a single, seamless collection of content.

The present invention is directed to a method for redirecting an editing environment to open a primary file of an HTML document instead of a supporting file that the editing environment has been directed to open. Each supporting file can be provided with a marker identifying it as a supporting file and specifying the location of the primary file. In response to opening a file, a search can be conducted for a marker in the file and the editing environment redirected to open the associated primary file if a marker is found. Exemplary processes for performing each of these tasks are now further described in turn.

Figure 2:
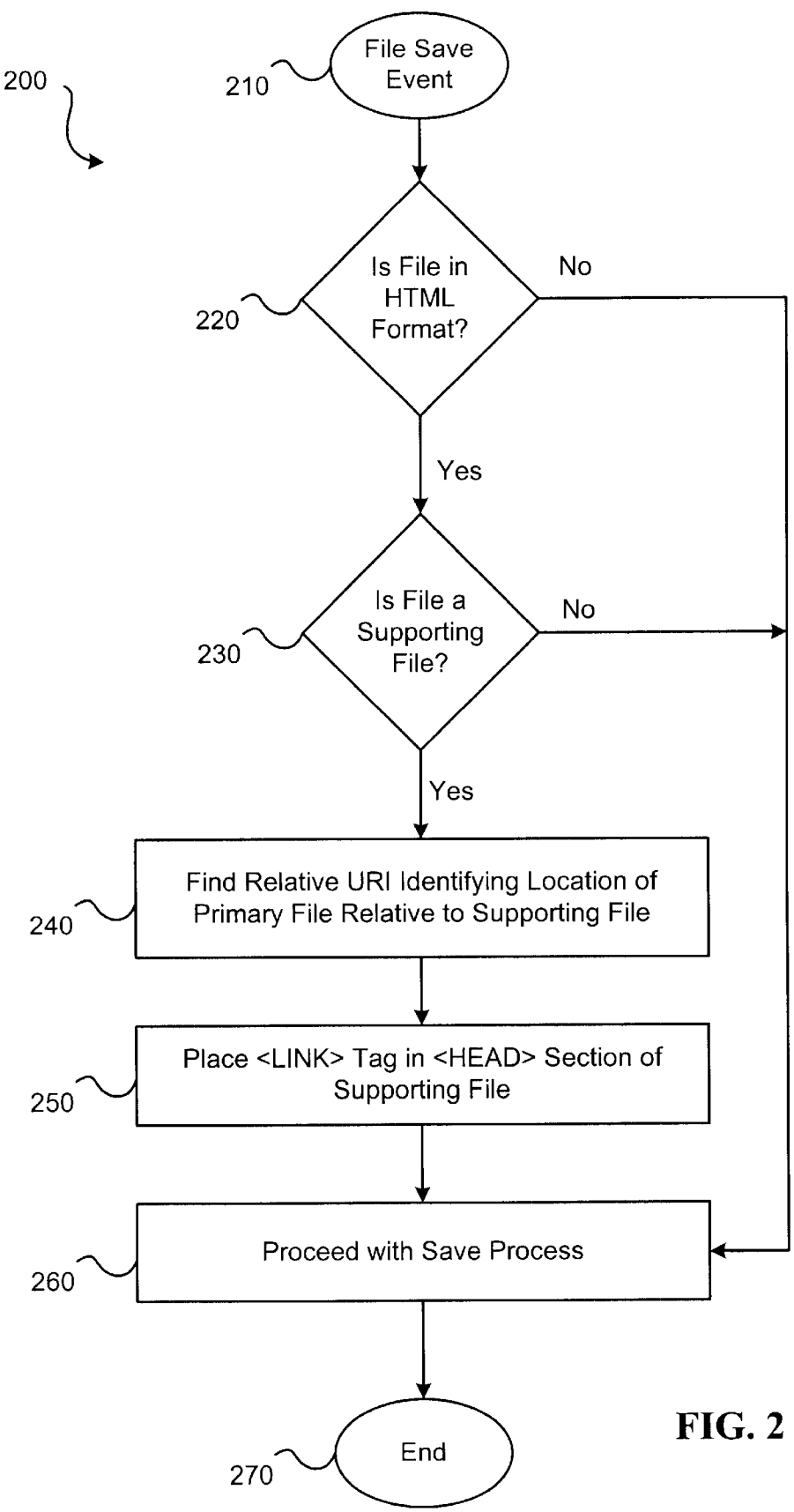
FIG. 2 is a flow chart illustrating the steps of an exemplary marker creation process.

FIG. 2 illustrates the steps of an exemplary marker creation process 200. The process 200 starts at step 210 with the initiation of a file save event for saving a file that has been created or modified in an editing environment.

In step 220, an inquiry is conducted to determine if the file for which the save event was initiated is in HTML format. If the file is not in HTML format, then the file save operation proceeds in step 260 without placing a marker in the file. After the file save operation is completed, the process 200 ends at step 270.

Returning to step 220, if the file for which the save event was initiated is in HTML format, then step 230 is performed.

In step 230, an inquiry is conducted to determine if the file is a supporting file. If the file is not a supporting file, then it must be a primary file. In this case, the file save operation proceeds in step 260 without placing a marker in the file. After the file save process is completed, the process 200 ends at step 270.

If, in step 230, the HTML file is identified as a supporting file, then step 240 is performed. In step 240, a relative Universal Resource Identifier (URI) identifying the location of the primary file relative to the location of the supporting file is found.

In step 250, a marker is placed in the supporting file to identify the file as a supporting file and to specify the location of the primary file. This marker is preferably in the form of an HTML <link> tag that is placed in the <head> section of the supporting HTML file. The use of HTML tags, such as the <link> tag, as well as the structure of HTML files generally, are well known to those skilled in the art. Accordingly, they will not be discussed in detail in this specification. Information about HTML standards can be found in the HTML 4.0 Specification published by the W3 Organization and available on the World Wide Web at "http://www.w3.org/TR/REC-html40/".

Those skilled in the art will appreciate that though the HTML 4.0 Specification provides for the use of <link> tags in the <head> section of an HTML document, there is no particular implementation specification for the <link> tag's parameters. Instead, application developers are free to determine how they will be used. These <link> tags are preferably used in an exemplary embodiment of the present invention as markers to identify an HTML file as a supporting file and to specify the location of the associated primary file. The <link> tag placed in the <head> section of the supporting file in step 250 preferably has the following format, though other formats are possible:

<link id=Main-File rel=Main-File href="RelURI">, where "RelURI" is the relative URI identifying the location of the primary file relative to the supporting file.

If the supporting file for an HTML document is being saved after an editing session modifying the HTML document, then the supporting file may have been previously saved in an earlier editing session that either created or modified the file. If the file was previously saved in accordance with the marker creation process 200, then the file will already have a <link> tag marker as shown in FIG. 2. In that case, a new marker need not be placed in the file. If, however, the location of the primary file has changed with respect to the supporting file, then the marker should be updated to reflect this information, preferably by changing the "RelURI" parameter in the <link> tag that is already in the file's <head> section. One way to discover if the <head> section of an HTML file already contains a <link> tag in the specified format at the time of the file save event is by parsing the <head> section using parsing techniques well known to those skilled in the art.

After the marker is placed in the supporting HTML file, other tasks necessary to save the file are completed in step 260. These other tasks depend on the particular save implementation used to complete the file save operation. As numerous different save implementations are possible and well known to those skilled in the art, they are not discussed further in this specification. After the file save process is completed, the process 200 ends at step 270.

Figure 3:
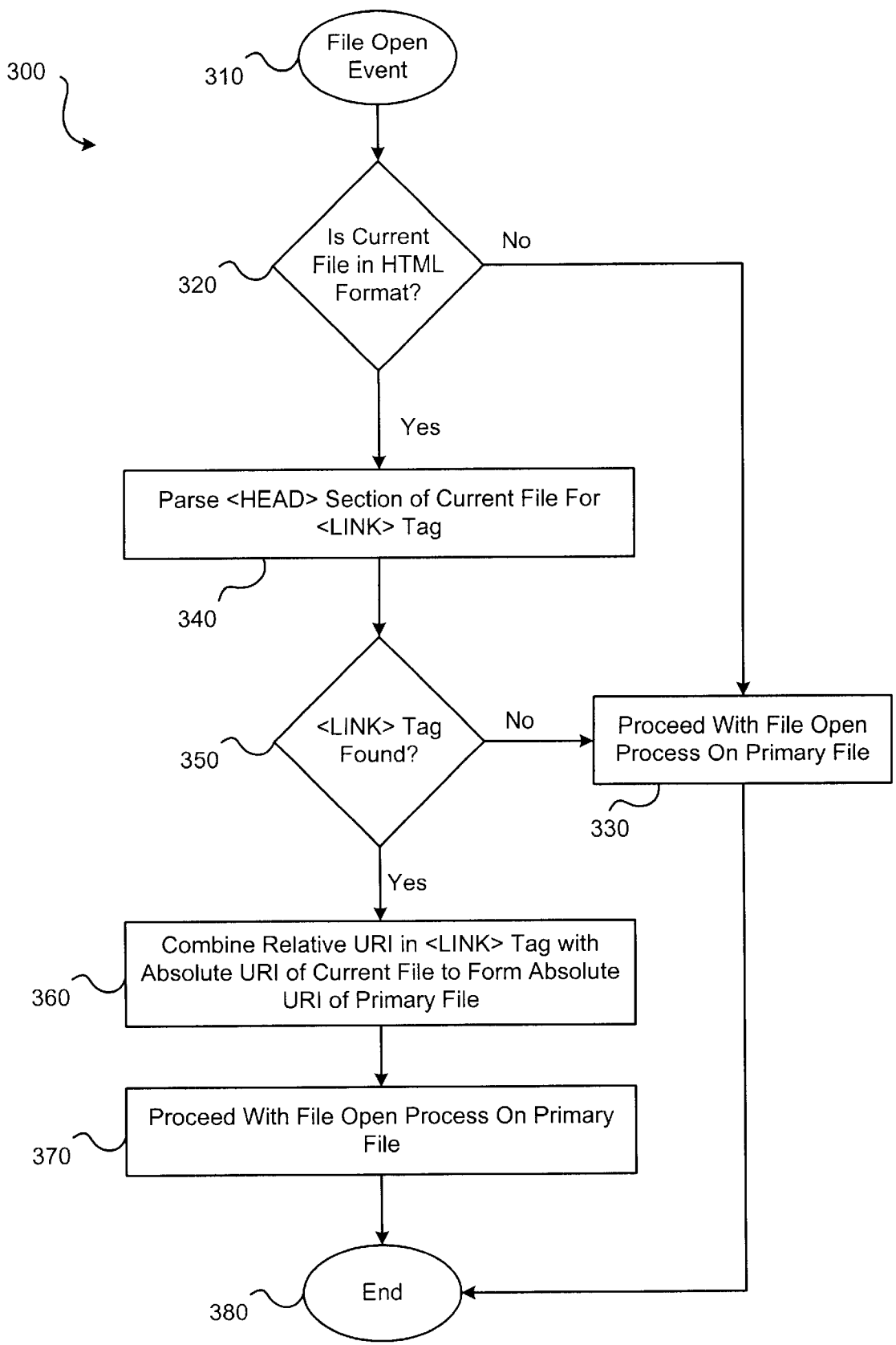
FIG. 3 is a flow chart illustrating the steps of an exemplary file open process for opening a file in an editing environment.

FIG. 3 illustrates the steps of an exemplary file open process 300. The process 300 starts at step 310 with the initiation of a file open event for opening a file in an editing environment.

In step 320, an inquiry is conducted to determine if the current file (i.e., the file for which the file open event was initiated) is in HTML format. If the current file is not in HTML format, then the file open process proceeds on the current file in step 330. The file open process used in step 330 will depend on the particular file open implementation chosen for the editing environment, as well as the file format of the current file. Numerous different file open implementations are possible and well known to those skilled in the art. After the file open process is completed on the current file, the process 300 ends at step 380.

Returning to step 320, if the current file is in HTML format, then step 340 is performed. In step 340, the <head> section of the current file is parsed for a <link> tag in the following format:

<link id=Main-File rel=Main-File href="RelURI">, where "RelURI" is a relative URI identifying the location of another file relative to the current file. A variety of well-known parsing techniques can be used to implement step 340.

Once the <head> section of the current file has been parsed for a <link> tag having the specified format, an inquiry is conducted in step 350 to determine if the <link> tag was found. If the specified <link> tag was not found, then the file open process proceeds for the current file in step 330. In this case, the current file is presumably a primary HTML file. The file open process used in step 330 will depend on the particular file open implementation chosen for the editing environment. Numerous different file open implementations are possible, but the file open process preferably works in accordance with the teachings of U.S. patent application Ser. No. 09/233,991. After the file open process is completed on the current file, the process 300 ends at step 380.

Returning to step 350, if the <link> tag in the specified format was found in the current file, then step 360 is performed. In accordance with the marker creation process 200, the presence of the <link> tag in this situation indicates that the current file is a supporting HTML file for a primary file also in HTML format. Moreover, the "relURI" in the href parameter of the <link> tag is presumably a relative URI specifying the location of the primary file relative to the current file. In step 360, the relative URI in the <link> tag is combined with the absolute URI of the current file to form an absolute URI specifying the location of the primary file.

Using the absolute URI specifying the location of the primary file, the primary file is opened in step 370. The file open process used in step 370 will depend on the particular file open implementation chosen for the editing environment. The file open process preferably presents the primary file and all associated supporting files in the editing environment as a single, seamless collection of content. As the current file is a supporting file associated with the primary file, the current file is also presented for editing in this preferred implementation. After the primary file is opened, the process 300 ends at step 380.

Conclusion

The invention may conveniently be implemented in one or more program modules, such as the Redirect Program Module 137, that are based upon the methods described in the detailed description. No particular programming language has been described for carrying out the various procedures described above because it is considered that the operations, steps, and procedures described above and illustrated in the accompanying drawings are sufficiently disclosed to permit one of ordinary skill in the art to practice an exemplary embodiment. Moreover, there are many computers and operating systems which may be used in practicing an exemplary embodiment and therefore no detailed computer program could be provided which would be applicable to all of these many different systems. Each user of a particular computer will be aware of the language and tools which are most useful for that user's needs and purposes.

One skilled in the art should recognize that the inventive concept of using a marker to redirect from one file to another file can be applied to other applications other than editing environments. Another application to which the concept could be applied is an HTML browser.

It is also contemplated that the inventive concept of redirecting an application from one file to another file can be practiced with files in any format, not just HTML. In this situation, the file from which the application is redirected can be thought of as a "supporting file," and the file to which the application is redirected can be thought of as a "primary file."

One skilled in the art should also recognize that many types of markers are possible. In the HTML environment, for example, <link> tags having a format different than that explicitly disclosed in this application are possible. Similarly, a <meta> tag could be used as a marker instead of a <link> tag. For file types other than HTML, an appropriate marker will depend on the particular file format.

Similarly, it is contemplated that it may be appropriate in certain circumstances to place a marker in a supporting file at a time other than in response to a file save event generated after creating or editing the supporting file. For example, if a computer system has a lot of primary and supporting files stored in its memory prior to a decision to implement the redirect feature in an application, then one may want to add markers to all the supporting files at one time instead of waiting for the supporting file to be edited.

One skilled in the art should also recognize that a marker need not specify the location of the primary file relative to the supporting file if the primary file is always stored in the same location relative to the supporting file. In the HTML environment, for example, two possible file configurations for storing HTML documents are the "flat" file layout and the "folder" file layout. These configurations are thoroughly discussed in U.S. patent application Ser. No. 09/233,991. If an application knows that it always saves HTML documents in only one of these two configurations, then the application will always be able to find the primary file once it knows the location of an associated supporting file without the necessity of consulting a marker for this information.

It is further contemplated that the redirection process may be bypassed in certain circumstances. One such circumstance would be an explicit instruction from a user. In this manner, a user could instruct an editing environment to open only a supporting file of an HTML document without opening either the primary file or the entire document. By opening only the supporting file, the user could concentrate on editing only that one file.

It should be appreciated that there are other features that could be implemented with the present invention. One such feature can be implemented if the supporting file represents embedded content of the primary file. After an editing environment has been directed to open a primary file instead of an associated supporting file, the editing environment could be further directed to display on screen a part of the primary file containing a part of the embedded content represented by the supporting file.

Other alternative embodiments will become apparent to those skilled in the art to which an exemplary embodiment pertains without departing from its spirit and scope.

Accordingly, the scope of the present invention is defined by the appended claims rather than the foregoing description.

What is claimed is:

1. A computer-implemented method for opening on a computer system an electronic document comprising a primary file and one or more supporting files, the method comprising the acts of:

placing an internal marker in each of the one or more supporting files during a file save event for the electronic document, the marker identifying that the primary file is associated with the one or more supporting files;

determining whether a supporting file includes the marker in response to an open file event for the supporting file;

in response to determining that the supporting file includes the marker, locating on the computer system the primary file based on the marker in the supporting file; and opening the primary file to complete the open file event.

2. The method of claim 1, wherein the marker further identifies a location on the computer system of the primary file.

3. The method of claim 1, further comprising the acts of:

determining whether the supporting file represents embedded content of the primary file; and if so, then displaying at least a portion of the embedded content in response to opening the primary file.

4. The method of claim 1, wherein the primary file and supporting file are formatted in HyperText Markup Language (HTML) format.

5. The method of claim 4, wherein the marker comprises an HTML <link> tag placed in a <head> section of the supporting file.

6. The method of claim 5, wherein the <link> tag comprises a relative Universal Resource Identifier (URI) specifying a location on the computer system of the primary file relative to the supporting file.

7. The method of claim 6, wherein the <link> tag comprises the format <link id=Main-File rel=Main-File href="RelURI">, wherein the "RelURI" parameter defines the relative URI specifying the location on the computer system of the primary file relative to the supporting file.

8. The method of claim 7, wherein the act of detecting the marker comprises parsing the <head> section of the supporting file to determine if the supporting file contains the <link> tag.

9. The method of claim 8, further comprising the act of combining the relative URI with an absolute URI specifying a location on the computer system of the supporting file to produce an absolute URI specifying a location on the computer system of the primary file, wherein the act of locating the primary file is completed by use of the absolute URI.

10. A computer-readable medium having computer-executable instructions for performing the acts of claim 1.

11. A computer-implemented method for opening electronic files stored on a computer system, wherein each electronic file comprises a primary file and at least one supporting file, the method comprising the acts of:

detecting a file open event for opening a file;

in response to the file open event, determining if the file includes a marker indicating that the file is a supporting file and that a primary file is associated with the supporting file; and if the file includes a marker indicating that the file is a supporting file and that a primary file is associated with the supporting file, locating the primary file based on the marker and opening the primary file to complete the open file event.

12. The method of claim 11, wherein the file open event is for opening the supporting file in an editing environment.

13. The method of claim 11, wherein the marker further identifies the location of the primary file in a computer system.

14. The method of claim 13, further comprising the act of placing the marker in the supporting file in response to a file save event for saving the supporting file.

15. The method of claim 14, wherein the file is formatted in HyperText Markup Language (HTML) format and the marker comprises an HTML link tag located in a header section of the supporting file.

16. The method of claim 15, wherein the link tag comprises a relative Universal Resource Identifier (URI) specifying a location on the computer system of the primary file relative to the supporting file.

17. The method of claim 16, wherein the act of determining if the file has a marker comprises parsing the header section of the supporting file for the link tag.

18. The method of claim 17, wherein the act of opening the primary file comprises the acts of:

combining the relative URI specifying the location on the computer system of the primary file relative to the supporting file with an absolute URI specifying a location on the computer system of the supporting file to produce an absolute URI specifying a location on the computer system of the primary file;

locating the primary file on the computer system using the absolute URI; and opening the primary file.

19. The method of claim 11, wherein the opening act comprises:

opening the supporting file, wherein the opening of the supporting file and the primary file are included as steps of a file open event for an electronic file comprising the supporting file and the primary file.

20. A computer-readable medium having computer-executable instructions for performing the acts of claim 11.

21. A computer-implemented method for opening electronic files stored on a computer system, wherein each electronic file comprises a primary file and at least one supporting file, the method comprising the acts of:

detecting a file open event for opening a file;

determining whether the file includes a marker indicating that the file is a supporting file for a primary file;

if the file does not include a marker indicating that the file is a supporting file for a primary file, opening the file to complete the open file event; and if the file includes a marker indicating that the file is a supporting file for a primary file, locating the primary file based on the marker and opening the primary file to complete the open file event.

22. The method of claim 21, wherein the act of opening the primary file to complete the open file event performed in response to determining that the file includes a marker indicating that the file is a supporting file for the primary file comprises:

opening the supporting file, wherein the opening of the supporting file and the primary file are included as steps of a file open event for an electronic file comprising the supporting file and the primary file.

23. The method of claim 21, wherein the marker further identifies a location on the computer system of the primary file.

24. The method of claim 21, further comprising the acts of:

determining whether the supporting file represents embedded content of the primary file; and if so, then displaying at least a portion of the embedded content in response to opening the primary file.

25. The method of claim 21, wherein the primary file and the supporting file are formatted in HyperText Markup Language (HTML) format.

26. The method of claim 25, wherein the marker includes an HTML <link> tag placed in a <head> section of the supporting file.

27. The method of claim 26, wherein the <link> tag includes a relative Universal Resource Identifier (URI) specifying a location on the computer system of the primary file relative to the supporting file.

28. The method of claim 27, wherein the <link> tag includes the format <link id=Main-File rel=Main-File href="RelURI">, wherein the "RelURI" parameter defines the relative URI specifying the location on the computer system of the primary file relative to the supporting file.

29. The method of claim 28, wherein the act of detecting the marker comprises parsing the <head> section of the supporting file to determine if the supporting file contains the <link> tag.

30. The method of claim 29, further comprising the act of combining the relative URI with an absolute URI specifying a location on the computer system of the supporting file to produce an absolute URI specifying a location on the computer system of the primary file, wherein the act of locating the primary file is completed by use of the absolute URI.

31. The method of claim 21, wherein the file open event is for opening the electronic file in an editing environment.

32. The method of claim 21, further comprising the act of placing the marker in the supporting file in response to a file save event for saving the file.

33. A computer-readable medium having computer-executable instruction for performing the acts of claim 21.

\* \* \* \* \*